United States Patent [19]

O'Brien

[11] Patent Number: 5,402,335
[45] Date of Patent: Mar. 28, 1995

[54] TWO-STEP METHOD CONSTRUCTING LARGE-AREA FACILITIES AND SMALL-AREA INTRAFACILITIES EQUIPMENTS OPTIMIZED BY USER POPULATION DENSITY

[75] Inventor: Francis J. O'Brien, Newport, R.I.

[73] Assignee: The United States of America as represented by the Secretary of the Navy, Washington, D.C.

[21] Appl. No.: 950,362

[22] Filed: Sep. 24, 1992

[51] Int. Cl.$^6$ ............................................. G06F 15/20
[52] U.S. Cl. .................................... 364/401; 364/400; 364/402
[58] Field of Search ................. 364/401, 406, 408; 395/905–907

[56] References Cited

U.S. PATENT DOCUMENTS 5,189,606  2/1993  Burns et al. ........................ 364/401

OTHER PUBLICATIONS

Caird J. K. "Pereceived patial layout of a simulated scene as a function of experience", 1991.
Nathan, J. "The use of multidimensional scaling technique for layout analysis", American Inst. Decision Sci., Atlanta, Ga. USA.
Dichtl, E. "The optimal arrangement of goods in warehouses with the aid of multidimensional scaling". Zeitachrift fur Operations Research, Serie B (PRAXIS) vol. 24.
O'Brien, F., "A Crowding Index for Finite Population", *Perceptual and Motor Skills*, 1990, 70, pp. 3–11.
Kruskal, J. B., "Non–Metric Multidimensional Scaling; A Numerical Method", *Psychometrika*, vol. 29, No. 2, Jun. 1964.
Siegel, A. L. J. J. Wolf, and J. Pilitsis (1982), "A New Method for the Scientific Layout of Workspaces", *Applied Ergonomics*, 13(2), 87–90.
Tullis, T. S., B. Sperling, and A. L. Steinberg (1986), "The Use of Multidimensional Scaling for Facilities Layout: An Application to the Design of the Space Station", *Proceedings of the Human Factors Society 30th Annual Meeting* (38–42).
Kruskal, J. B., "Multidimensional Scaling by Optimizing Goodness of Fit to a Nonmetric Hypothesis" *Psychometrika* vol. 29, No. 1 (1964).

*Primary Examiner*—Gail O. Hayes
*Assistant Examiner*—Frantzy Pornvil
*Attorney, Agent, or Firm*—Michael J. McGowan; Prithvi C. Lall; Michael F. Oglo

[57] ABSTRACT

A two-step method is disclosed that enables in the first step to optimize facilities layout on the scale of miles with regard to, among others, population density and that enables in the second step to optimize intrafacilities layout on the scale of feet with regard to, among others, population density using non-metric multidimensional scaling (MDS) matrices in both the first and second steps.

16 Claims, 3 Drawing Sheets

TWO-STEP METHOD CONSTRUCTING LARGE-AREA FACILITIES AND SMALL-AREA INTRAFACILITIES EQUIPMENTS OPTIMIZED BY USER POPULATION DENSITY

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This patent application is co-pending with three related patent applications entitled, respectively, Ser. No. 07/754,779, filed Aug. 30, 1991, entitled "Process Which Aids in the Laying Out of Locations of Personnel and Equipments in Functional Organizations, Including Features of Special Applicability Where a Capability for Handling an Unlimited Number of Personnel/Equipment Data Items is Desired", Ser. No. 07/754,789, filed Aug. 30, 1991, entitled "Process Which Aids in the Laying Out of Locations of Personnel/Equipments in Functional Organizations, Including Feature of Special Applicability Where the Number of Personnel/Equipment Data Items Does Not Exceed 100", and Ser. No. 07/756,264, filed Aug. 30, 1991, entitled "Process Which Aids in the Laying Out of Locations of Personnel and Equipments in Functional Organizations, Including a Features of Use of Abbreviated Calculation Routines", all three by the same inventor as herein and each incorporated herein in its entirety by reference.

BACKGROUND OF THE INVENTION (1) Field of the Invention

This invention provides a process which enables to construct large-area facilities and small-area intrafacilities equipment optimized by user population density.

(2) Description of the Prior Art

The conventional formula to measure or model two-dimensional discrete spatial density, i.e., population density or physical crowding is defined as the average number of objects (n) per unit area of space (A):

$$D = n/A \tag{1}$$

This definition has severe shortcomings since actual spatial orientation within a specified area is disregarded. As an example of this shortcoming, refer to FIG. 1 which displays three different configurations of objects or density points. In each case, the "perceived density" of the four points is obviously different. Since the number of points and area are identical in each depiction, there is a constant value of 0.25 for population density. FIG. 2 depicts geometrically the population demographer's model of population density shown for the distributions in FIG. 1. FIG. 2 shows that each point occupies four space units (such as feet); hence, population density or physical crowdedness (D=n/A) equals one object per four square feet. FIG. 2 represents the model for each depiction of FIG. 1. However, large differences in perceived physical crowding clearly exist among the three configurations shown in FIG. 1.

A formula was then derived by the inventor to capture the differences shown in FIG. 1 more accurately by taking the actual spatial orientation of objects into account. See O'Brien, F., "A Crowding Index for Finite Populations", *Perceptual and Motor Skills*, February 1990, 70, pp. 3–11 which is incorporated into this disclosure in its entirety by reference.

This formula, referred to as the Population Density Index (PDI), is as follows:

$$PDI = \frac{1}{d} \sqrt{\frac{n}{A}} \tag{2}$$

where
n = number of objects
A = the geometric area, and
d = average Euclidean distance among all possible pairs of n objects.

Basically, the above proposed formula is a generalization of the bivariate Euclidean distance formula. The derivation of the proposed density formula is patterned on the well known square-root law used in the physical sciences. It may be noted in passing that PDI has the conceptual meaning:

$$\frac{\text{Average distance of one pair of points}}{\text{Average distance of all possible pairs of points}} \tag{3}$$

Assume two objects are plotted on an X, Y Cartesian coordinate system with a fixed origin O. The mathematical distance between the two objects is measurable by simple analytic geometry using the Pythagorean distance formula:

$$d_{12} = [(X_1-X_2)^2 + (Y_1-Y_2)^2]^{\frac{1}{2}} \tag{4}$$

where $(X_1,Y_1)$; $(X_2,Y_2)$ represent each object's coordinates.

If, now, we conceive of n objects, each given coordinates within the same geometric plane such as a room, it is possible to generalize the above formula to obtain an average Euclidean distance among the n objects. The average Euclidean distance of n points, considered pairwise, is given by:

$$\bar{d} = \frac{2 \sum_{i<j} d_{ij}}{n(n-1)} \tag{5}$$

where $d_{ij}$ is the Euclidean distance between any two objects. Note that for n=2 objects, d; $d_{12}$ are equivalent.

The last step in deriving a density index is to scale d to adjust for a given number of objects residing within a specific area. A proposed general formula based on the square-root inverse law for distances incorporating size of area and the number of objects is:

$$\Delta = \bar{d} \sqrt{\frac{A}{n}} \tag{6}$$

where
A = the geometric area in which objects reside, and
n = the number of objects within one area.

Dimensional analysis, as well as empirical Monte Carlo simulation investigations, of Δ shows that the units are:

$$\frac{A}{\sqrt{n}} ; \frac{ft^2}{\sqrt{n}} \qquad (7)$$

Essentially, $\Delta$ is the average pairwise Euclidean distance among n objects scaled for a given unit area. As will become evident in the following numerical example, $\Delta$ is inversely related to the average geometric distances among n points. Calculating the reciprocal of $\Delta$, $1/\Delta$ will make the relationship monotonically increasing, that is, the more densely packed the objects, the higher the value of the index. This reciprocal of $\Delta$, or $1/\Delta$, is arbitrarily referred to as the population density index, or PDI. The units for PDI are $\sqrt{n}/A$.

A computational example is provided with the aid of FIG. 3. For four points, there are $4 \times 3/2 = 6$ pairwise distances to calculate. The coordinate points for the 4 units are (1,1), (1,3), (2,4) and (3,2). The area shown is 16 units. Applying $\Delta$, Calculating the reciprocal of $\Delta$ and multiplying by 10 to give integer results, PDI=2.3.

$$\Delta = \frac{2(d_{12} + d_{13} + d_{14} + d_{23} + d_{24} + d_{34})}{4(3)} \sqrt{\frac{A}{n}} = \sqrt{\frac{16}{4}} (2.22) = 4.4 \qquad (8)$$

The $\Delta$ index appears to be valid even when areas differ by a large amount. To demonstrate this, consider FIGS. 4A and 4B. The average Euclidean distances are identical (1.6) in each situation depicted. The smaller value of $\Delta$ in FIG. 4A (3.7) is in accord with the basic interpretation of $\Delta$, that is, the smaller the value of $\Delta$, the more densely packed are the points relative to the allowed area. The results also correspond to the intuitive notion of density.

The proposed crowding index, $\Delta$ or PDI, should be interpreted as a relative measure much like a standard deviation in statistics. The theoretical mathematical minimum value of $\Delta$ or PDI is always 0, a condition realizable with dimensionless points but not realizable with solid objects such as people.

The maximum value depends on the number of objects and the geometric area. Beyond three or four objects, it becomes difficult and perhaps meaningless to attempt calculating a precise maximum value of $\Delta$ or PDI. For these reasons, hypothetical minimum and maximum bounds of the PDI formula are derived below and presented as an integral component of the disclosure of the last named application in the section "cross-reference" above. Three additional properties derived from the square-root law for average distances of $\Delta$ or PDI appear to be critical to the usefulness and interpretability of the index: 1) for constant area, PDI varies directly with the number of objects; 2) for a constant number of objects, PDI varies indirectly with area; and 3) for a constant number of objects and constant area, PDI varies indirectly with distance. Small sample Monte Carlo simulations performed by the inventor have supported these square-root properties for the PDI formula. The values of PDI computed from randomly selected uniform distributions correlated 0.96 with the conventional formula for population density (n/A). In addition, the PDI formula can be evaluated on three key scientific criteria. First, the model is very simple. It connects population density to three key variables—distance, number of points and area— through an equation that can be readily calculated. Second, the formula is justified by mathematical analysis. The inverse square-root properties of the index stated as conjectures are very reasonable and provide a context for prediction and explanation of observed results. Monte Carlo simulations support each conjecture, thereby providing preliminary justification until large scale simulations can be conducted. Third, the formula has been tested and verified by empirical research. The use of the formula in hypothetical military settings has produced results that were readily interpretable and which correlated with qualitative estimates of crowding made by independent expert observers.

The population density formula attempts to express differences such as those shown in FIG. 1 more accurately than the conventional population density formula. Since the index can vary widely, as indicated in FIG. 1, it was necessary to develop a new model to predict minimum and maximum bounds of the population density index values. The model was then expanded to accommodate any number of density points, and both of these models are discussed below. However, these new models were useful only if the actual PDI (Population Density Index) could be calculated. Thus, a new approximation method has been devised in the last named patent application in the "cross-references" section above where it is not possible to calculate the actual PDI.

SUMMARY OF THE INVENTION

The present invention is an improvement on the foregoing models in the "cross-references" section. Unlike the earlier PDI models, which include a measure of interobject distance and is scaled for a geometric area on the order of feet enabling measurement of population density with greater precision and flexibility than the conventional population density model, the present invention provides for the situation which is preliminary to using the three models, namely, it enables in a first step to layout the facility on a measure of miles after which, any of the three models can, with advantage, be employed. The facilities layout of the first step enables space management globally after which any one of the other three models can be used locally in a second step after the space management has been globally layed out in the first step. The population density index model of the first step of the invention is designed to accommodate any number of density points for a global scale.

In this disclosure, where the global layout is on the order of miles in the first step, the PDI model can be applied to any military setting or other settings such as "circuses", emerging "tent" cities and the like. It can be used in any application for the measurement of discrete spatial population density for any number of density points. Also, this PDI model need not be limited to people. It can be applied to any representable two dimensional configuration of points as diverse as stars, microscopically observable data such as living microorganisms, automobile traffic, aerial photographic data and the like. By rational extension, the model can be applied to three dimensional configurations such as multi-floored structures.

Accordingly, the principal objects of the present invention are:

(1) To provide a process which aids in the laying out of the locations of building and other large structures where the layout is on the order of miles in a functional organization in a quadrilateral area.

(2) To provide a process which aids in the laying out of the locations in a functional organization in a quadrilateral area, in a two-step process where the first step lays out the global structure of a military base or other large-scale objects, and in a second step, to lay out objects locally, for example, personnel and equipments, after the global layout has been set forth.

(3) To provide a process in a first step which aids in the laying out of the locations of buildings and other structures on a functional military reservation or base in a quadrilateral area, and which provides a high level of precision in the discrimination of adverse crowding effects as between compared layout solutions in which miles is the mathematical unit of measurement.

(4) To provide a process in a second step which aids in the laying out of locations of personnel and equipments in the buildings and other structures of a functional military reservation or base in a quadrilateral area, and which provides a high level of precision in the discrimination of adverse crowding effects as between compared layout solutions in which feet is the mathematical unit of measurement.

(5) To provide a process in a first step which aids in the laying out of locations of buildings and other structures on a functional military reservation or base in a quadrilateral area, and which is applicable for a range of personnel/equipment data items of unlimited number with area units of miles.

(6) To provide a process in a second step which aids in the laying out of locations of personnel and equipments in the buildings and structures of a functional military reservation or base in a quadrilateral area, and which is applicable for a range of personnel/equipment data items of unlimited number with area units of feet.

(7) To provide a process in a first step which aids in the laying out of locations of buildings and other structures on a functional military reservation or base in a quadrilateral area, with miles as the dimensional unit, and which is universal in its applicability to subject matters that can be modeled as discrete spatial population density points where miles is the mathematical unit of measurement.

(8) To provide a process in a second step which aids in the laying out of locations of personnel and equipments in the buildings and other structures of a functional military reservation or base in a quadrilateral area, with feet as the dimensional unit, and which is universal in its applicability to subject matters thatcan be modeled as discrete spatial population density points where feet is the mathematical unit of measurement.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 7A depicting a minimum density situation; FIG. 7B depicting a maximum density situation; FIG. 7C depicting an actual observed density situation; and FIG. 7D depicting a hypothetical lattice translation of FIG. 7C;

DESCRIPTION OF THE PREFERRED EMBODIMENT

For the remainder of this disclosure, reference will be made particularly to FIGS. 5–9.

The process which aids in laying out of personnel stations and/or equipment locations on a global scale and locally within a functional organization in accordance with the present invention includes provision of a novel modeling technique, which is performed in two steps. In a first step, PDI algorithms for global placement on the scale of miles are disclosed, and in a second step objects are locally placed. In the last-named disclosure in the "cross-references" section, first, given the sample size of density points and geometric area of interest, the points are plotted in a lattice or uniform, that is, two dimensional grid, distribution, that is, in a checkerboard arrangement with every consecutive horizontal and vertical point being equidistant. Secondly, using this plotted distribution, two theoretical indices are calculated—a lower bound density index and an upper bound density index. Thirdly, the data regarding personnel and/or equipments which are the subjects of the layout are collected and the population density index values are calculated. The inventor in the last-named case in the "cross-referenced" section has proven mathematically that the actual PDI ($PDI_{act}$) is bounded by the minimum and maximum PDIs. Fourthly, the "effective interpoint distance" index is calculated based on the actual population density index values, and the research findings are compared to the model indices.

The two-step model of the invention allows an evaluation of the different layout solutions explored as part of a given layout task, and enables comparisons with solutions provided in connection with other layout tasks. In the second step, the lattice or uniform distribution is an effective visual aid for demonstrating how population density changes with dynamic human or equipment positioning being recorded at will.

In the second step, the lower bound of the population density index can be calculated for any uniform arrangement of points. The lower bound is based on a lattice of the integers called a "unit lattice". In general, a unit lattice means a uniform distribution of n points in area A such that n=A. This implies that the interpoint distance of consecutive horizontal and vertical points is always equal to 1. A nonunit lattice will mean that n and A are not equal. In the special cases of n=2 and n=3 objects, "unit lattice" means either a unit line segment (n=2) or, for n=3, a Euclidean equilateral triangle (perimeter=3 units), each constructed in the interior of A. A linear dimension is herein designated in feet.

Figure 1:
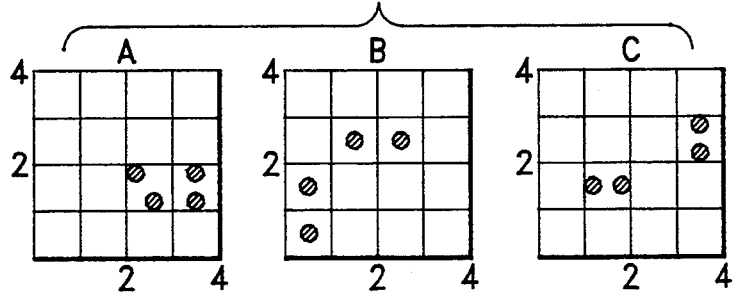
FIGS. 1A, 1B, and 1C are different examples of population density configurations depicting different positioning, respectively, of the same number of density points in a uniform lattice.
Figure 2:
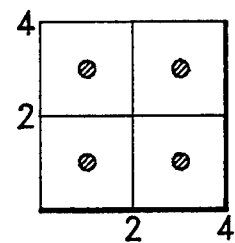
FIG. 2 depicts the population demographer's model of population density for each of FIGS. 1A, 1B, and 1C.
Figure 3:
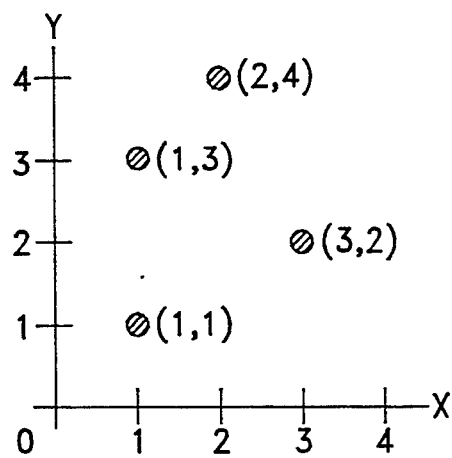
FIG. 3 is a depiction of four density points plotted on an X, Y Cartesian coordinate system with a fixed origin 0.
Figure 5:
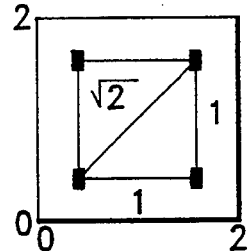
FIG. 5 is an example of a 2×2 "unit" lattice containing four connected density points.
Figure 4A:
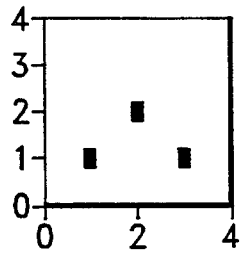
FIGS. 4A and 4B depict three density points, with identical average Euclidean distances between them but positioned, respectively, on different sized areas.
Figure 4B:
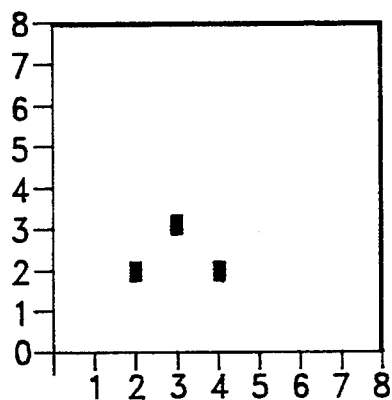

FIG. 5 is an example of a 2×2 unit lattice. In FIG. 5, note that the area is 4 ft² and that the number of points is 4, or n=A. The horizontal and vertical distance between each of the consecutive points is equal to 1. This is derived from a simple relation that provides interpoint distances of lattices. Namely, if $\delta$ denotes the interpoint distance, then $$\delta = \sqrt{4 \frac{ft^2}{4}} = 1 \tag{9}$$

where $\delta$ is in feet.

The above example illustrates the approach that is used for approximating interpoint distances for any lattice of n points uniformly distributed in area A. The general formula to do this is given by:

$$\delta = \sqrt{\frac{A}{n}} \tag{10}$$

The next step, calculating the average Euclidean distance of all possible pairs of points in FIG. 5, is given by:

$$\overline{\Delta} = \frac{1+1+1+1+\sqrt{2}+\sqrt{2}}{6} = 1.14 \tag{11}$$

The average Euclidean distance for a unit lattice is called $\overline{\Delta}$ distinguish it from the general Euclidean distance given by d in the general population density index formula:

$$PDI = \frac{1}{d} \sqrt{\frac{n}{A}} \tag{12}$$

The population density index value for the unit lattice of FIG. 5 can now be calculated. To do this, first substitute the numerical value $\overline{\Delta}$ (i.e., 1.14) from the above calculation, into the general population density index formula:

$$PDI = \frac{1}{d} \sqrt{\frac{n}{A}} \tag{13}$$

$$PDI = \frac{\sqrt{\frac{4}{4}}}{1.14} \approx 0.88 \tag{14}$$

The reference parameter "lower bound estimate of the index for a nonunit lattice" can now be derived. (Note that this reference parameter is a hypothetical concept). It will be appreciated that this is prior to conducting the density analysis. At that time, the task worker will have collected data providing a knowledge of the number of points in the area, but the expected lower bound Euclidean distance will not be known. The known average interpoint distance relationship of equation:

$$\delta = \sqrt{\frac{A}{n}} \tag{15}$$

is used to calculate the average Euclidean distance for any nonunit lattice with the same number of points as the unit lattice distribution. The formula to calculate the average Euclidean distance associated with the minimum density ($d_{min}$) is given in the following equation:

$$\overline{d}_{min} = \overline{\Delta} \sqrt{\frac{A}{n}} \tag{16}$$

That is, each coordinate point in the unit lattice is scaled by a constant, equal to $\delta$ in equation:

$$\delta = \sqrt{\frac{A}{n}} \tag{17}$$

to calculate the lower bound of the average Euclidean distance. Thus, the lower-bound model of the population density index is obtained by replacing d in the general population density index formula:

$$PDI = \frac{1}{d} \sqrt{\frac{n}{A}} \tag{18}$$

by $d_{min}$ in equation:

$$\overline{d}_{min} = \overline{\Delta} \sqrt{\frac{A}{n}} \tag{19}$$

and simplifying. The result is the lower bound (PDI$_{min}$):

$$PDI_{min} = \frac{1}{\overline{\Delta}} \frac{n}{A} \tag{20}$$

Figure 6:
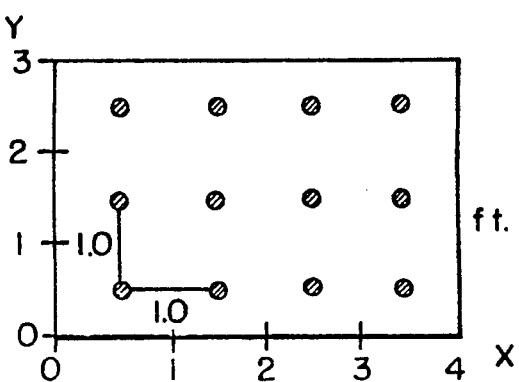
FIG. 6 depicts a 4×3 "unit" lattice containing twelve density points.

To provide an example of calculating the population density index lower-bound (PDI$_{min}$), assume a study is being conducted on 12 people. Also assume the area involved in the study is a square with area of 25 ft². The appropriate $\Delta$ to select from Table 1 is based on n=12. There are two logical choices in the selection of a unit lattice of 12 points: 4×3 and 6×2 or equivalently 3×4 and 6×2. A unit lattice of 4×3 or 3×4 will provide an excellent estimate of the lower-bound value of the index for this square. The only other logical choice for a uniform distribution of 12 points is the unit lattice 6×2 or 2×6; however, with this choice, the 12 points cannot be accommodated into a 5-ft.×5-ft. area with interpoint distance $\delta$=1.4. FIG. 6 shows the 4×3 unit lattice. $\overline{\Delta}$ can be calculated using equation 46, below. Thus, the lower bound population density index based on equation:

$$PDI_{min} = \frac{1}{\overline{\Delta}} \frac{n}{A} \qquad (21)$$

is (1/1.90) (12/25), which is approximately equal to 0.25. The population density index can be no smaller than 0.25 units in a lattice distribution consisting of 12 (4×3 unit lattice) points and area 25 ft² with interpoint distance of about 1.4.

The calculation of the upper bound of the index is based on a further assumption. It is assumed that there is a minimum (nonzero) interpoint distance between any two neighboring points in a uniform distribution corresponding to some practical lower limit of elbow room allowable between persons. The distance value selected will correspond to a lattice distribution that produces the maximum population density index value for the given number of objects and area in a layout task. Selecting the minimum interpoint distance is empirical. To exemplify the derivation, assume that 1 ft is the minimum value. As is widely accepted by persons skilled in the art to which the present invention pertains, this distance might correspond to the nose-to-nose distance of two persons positioned shoulder-to-shoulder. Other values of minimum interpoint distance, appropriate to the circumstances of the functional organization involved in a given task at hand of laying out objects, are to be selected by the layout analyst employing this invention. Then the task worker computes it as a reasonable value to choose based on the known opinion of experts. Other values could be chosen by this analyst who could derive personally upper bounds for the population density index using the derivation that follows.

The assumption that 1 ft is the practical minimum interpoint distance translates into $\delta$ of $\delta=(A/n)^{\frac{1}{2}}$ being set to 1. From this, it follows from the generalized average Euclidean distance equation:

$$\overline{d}_{min} = \overline{\Delta} \sqrt{\frac{A}{n}} \qquad (22)$$

that the upper bound of the average Euclidean distance ($d_{max}$) is:

$$\overline{d}_{max} = \overline{\Delta} \sqrt{\frac{A}{n}} = \overline{\Delta} \qquad (23)$$

Substituting equation:

$$\overline{d}_{max} = \overline{\Delta} \sqrt{\frac{A}{n}} = \overline{\Delta} \qquad (24)$$

into the general population density index formula:

$$PDI = \frac{1}{\overline{d}} \sqrt{\frac{n}{A}} \qquad (25)$$

gives the upper bound:

$$PDI_{max} = \frac{1}{\overline{\Delta}} \sqrt{\frac{n}{A}} . \qquad (26)$$

Equation $$PDI_{max} = \frac{1}{\overline{\Delta}} \sqrt{\frac{n}{A}} \qquad (27)$$

gives the expected reference parameter "upper bound of the population density index in a lattice" distribution (which is a hypothetical concept) assuming a 1-ft distance as the practical minimum value of interpoint elbow room. From the earlier example where n=12 objects and area =25 ft², $PDI_{max}$ is equal to:

$$PDI_{max}=(1/1.90)(12/25)^{\frac{1}{2}}=0.36. \qquad (28)$$

That is, density can be no larger than 0.36 units when the 12 density points are distributed uniformly with a one foot distance between each horizontal or vertical point.

In general, if the selected interpoint distance is some arbitrary constant c, then $PDI_{max}$ is:

$$\delta = \sqrt{\frac{A}{n}} \qquad (29)$$

$$PDI_{max} = \frac{1}{c\overline{\Delta}} \sqrt{\frac{n}{A}} \qquad (30)$$

For example, if 1 in. is the selected value for c, then the maximum population density index value is $$PDI_{max}=12(1/1.90)(12/25)^{\frac{1}{2}}=4.38. \qquad (31)$$

The final index provided by the model is called the actual effective interpoint distance or $\delta_{eff}$. The effective interpoint distance index translates the clustering of n points observed in an actual study into a lattice distribution for which an hypothetical interpoint distance, or effective interpoint distance can be determined and compared with the theoretical maximum interpoint distance of uniform dispersions in nonunit lattices provided by equation:

$$\delta = \sqrt{\frac{A}{n}} . \qquad (32)$$

The utility of this comparison resides in the fact that $\delta_{eff}$ varies in accord with the relation $1 \leq \delta_{eff} \leq \delta$.

The effective uniform interpoint distance index can be derived as follows. A generalized version of equation:

$$\overline{d}_{min} = \overline{\Delta} \sqrt{\frac{A}{n}} \qquad (33)$$

provides the average Euclidean distance for any lattice. For $d_{min}$ equation:

$$\overline{d}_{min} = \overline{\Delta} \sqrt{\frac{A}{n}} \qquad (34)$$

is calculated directly. For $d_{max}$, $(A/n)^{\frac{1}{2}}$ is set equal to some hypothetical constant (such as 1). Now, a reference parameter "interpoint distance" such as $\delta=(A/n)^{\frac{1}{2}}$ can be conceived theoretically as a variable number for any population density index value in a study with n persons and area A. An interpoint distance such as δ is strictly determined by the average Euclidean distance and vice versa. Hence, the following equation expresses the hypothetical relationship between the actual Euclidean distance $d_{act}$ of an observed population density index value and another reference parameter $\delta_{eff}$:

$$\bar{d}_{act} = \bar{\Delta} \delta_{eff} \quad (35)$$

Solving for δ gives:

$$\delta_{eff} = \frac{\bar{d}_{act}}{\bar{\Delta}} \quad (36)$$

From the earlier discussion, it is obvious that $\delta_{eff}$ expresses the ratio of the actual PDI relation to the maximum PDI and expresses in average interpoint distances. Equation:

$$\delta_{eff} = \frac{\bar{d}_{act}}{\bar{\Delta}} \quad (37)$$

can be stated explicitly in terms of the actual population density index ($PDI_{act}$) of the general population density index formula (equation 25 hereinabove):

$$\delta_{eff} = \frac{1}{PDI_{act}\bar{\Delta}} \sqrt{\frac{n}{A}} \quad (38)$$

Either equation:

$$\delta_{eff} = \frac{\bar{d}_{act}}{\bar{\Delta}} \quad (39)$$

or $$\delta_{eff} = \frac{1}{PDI_{act}\bar{\Delta}} \sqrt{\frac{n}{A}} \quad (40)$$

provides the effective interpoint distance in a population density study. To provide an example of effective interpoint distance, assume that in the example described earlier with 12 persons in an area of 25 ft² (refer to FIG. 7), that the actual calculated PDI value ($PDI_{act}$) is 0.30. If a uniform distribution of the 12 points is constructed, what is the interpoint hypothetical uniform distance that preserves the actual average Euclidean distance? $\delta_{eff}$ based on equation:

$$\delta_{eff} = \frac{1}{PDI_{act}\bar{\Delta}} \sqrt{\frac{n}{A}} \quad (41)$$

is equal to $$(1/0.30)(1/1.90)(12/25)^{\frac{1}{2}} = 1.2 \text{ ft.} \quad (42)$$

Figure 7:
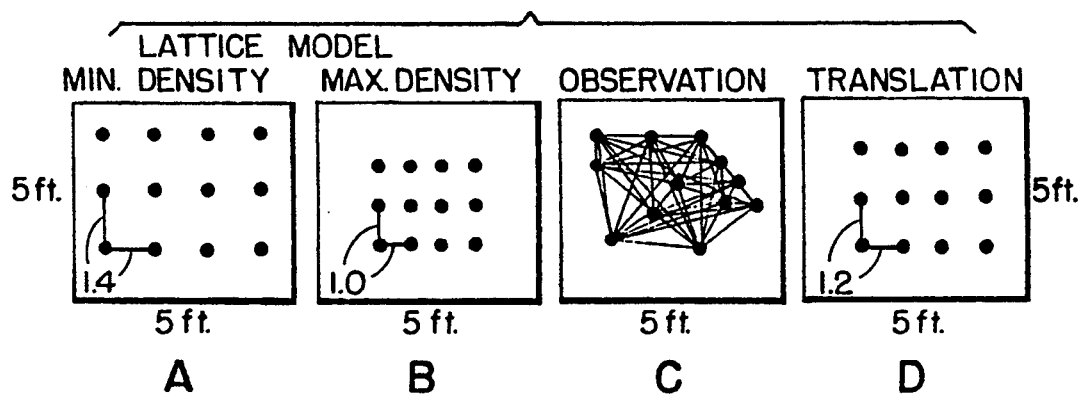
FIGS. 7A, 7B, 7C, and 7D each represent a 5 ft×5 ft area containing twelve points.

That is, a population density index value of 0.30 means that the 12 persons can be arranged theoretically in a uniform distribution such that the hypothetical interpoint uniform distance is about 1.2 feet. This value can be compared with $$\delta = \sqrt{\frac{25}{12}} \approx 1.4 \quad (43)$$

which corresponds to the hypothetical inter point maximum uniform dispersion of 12 persons in a 25 ft² area. When this is done, the percent increase in density associated with a population density index of 0.30 is approximately 20 percent (1.2 vs 1.4 ft). In summary, $\delta_{eff}$ gives a useful (visual) mathematical summarization of discrete spatial density, translated into terms of uniform interpoint distance language. To collect all of the information contained in the model, FIG. 7 is presented as a summary for the example employing 12 persons within an area of 25 ft². The assumptions and findings for this example were as follows. First, n was selected as 12 and the area was 25 ft². Secondly, a unit lattice of 4×3 was determined to be appropriate for the calculation of the unit lattice Euclidean distance $\bar{\Delta}$ (1.90, see FIG. 6). In the third step of the model, lower and upper bounds of the population density index were calculated to be 0.25 and 0.36 units, respectively. The lower and upper bounds of the index were shown to be describable in terms of uniform interpoint distances. In the example, those values were 1.4 and 1.0 feet for the lower and upper bounds, respectively. It was then demonstrated how to translate the actual PDI value into a uniform interpoint distance:

$$\delta_{eff} = \frac{1}{PDI_{act}\bar{\Delta}} \sqrt{\frac{n}{A}} \quad (44)$$

The data points with an actual PDI value of 0.30 were then translated into a uniform distribution of points ("effective distance") which was calculated to be 1.2 ft. Finally it was suggested that one way to interpret the actual density index was by comparison of the effective interpoint distance presented immediately above with the maximum nonunit lattice interpoint distance of the following equation: $\delta = (A/n)^{\frac{1}{2}}$. This comparison suggested that the actual clustering of the points was 20% more congested than the uniform distribution with minimum density.

PDI has a useful application in that it can accurately explain the relationship of objects in a particular space for any number of density points. Although there may appear to be sufficient room between objects using the subjective "eyeball" test, the PDI model could indicate otherwise since it is based on sound objective mathematical principles. Using PDI, one is able to calculate the most advantageous placement of objects to minimize crowding. Thus, the PDI could be used to eliminate clustering of people or objects, enhance peripheral vision and hearing, and provide sufficient elbow room and freedom of movement when used in conjunction with state-of-the-art facilities layout mathematical methodologies discussed below.

As a specific example, the population density index can be applied in a military setting as a useful relative general measure of personnel congestion in a submarine combat control center. The reader must note that all examples are purely hypothetical. One of the problems inherent in the combat control center is crew density. Many people work in a confined area with a large amount of equipment. In the control room of a hypothetical future generation submarine, for example, may be common for approximately 20 to 26 individuals to work in an area of 40 feet wide by 11 feet long. Equipment density is an unavoidable constraint due to the limitations in hull size. However, crew density can change given an equipment rearrangement. In such an environment, the crew members perceptions as well as their actual congestion might contribute to a fatal loss of efficiency. The PDI model is designed to analyze just such a situation. Thus, the PDI formula, which measures the average distance between any two crew members as they are actually distributed scaled by the distance between adjacent crew members assuming that they position themselves uniformly throughout the workspace, will provide a quantitative analysis as to the best arrangement of the equipment in order to ensure that the equipment is readily accessible, errors are reduced, and performance is enhanced, all of which are compromised in part by overcrowding.

Figure 8:
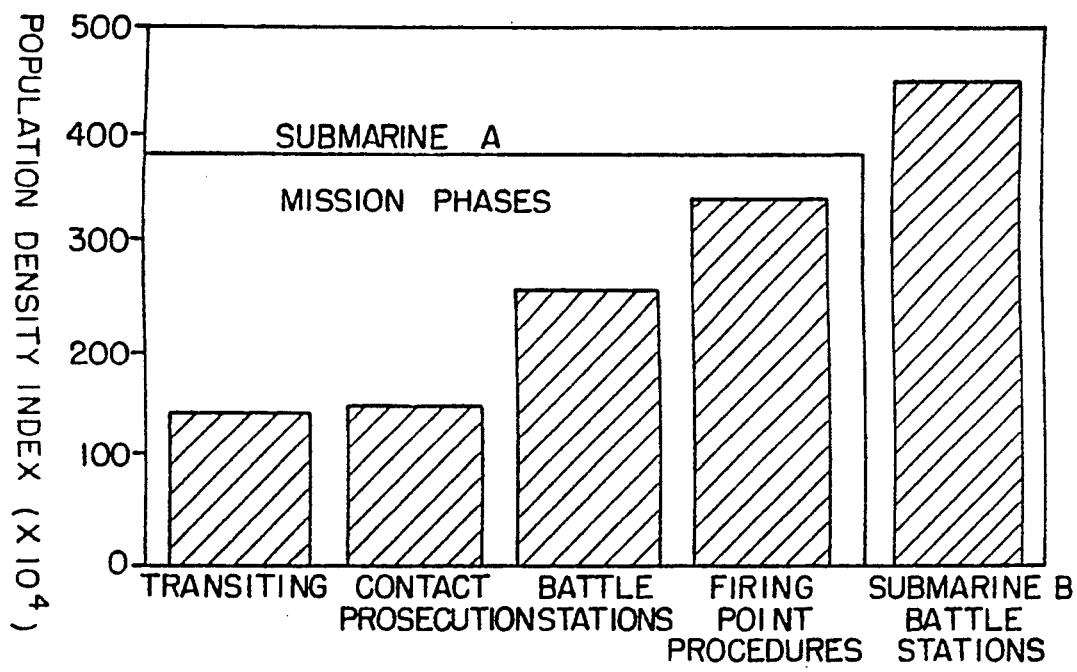
FIG. 8 is a bar graph presenting values of PDI for four major phases of a hypothetical submarine scenario and comparing PDI values for one phase in submarines of two different sizes.

FIG. 8 shows experimentally determined values of PDI as in Ser. No. 07/756,264 for four major phases of a hypothetical submarine scenario. Data for the PDI were obtained by a mock participation in a structured walkthrough of submarine missions in a full-scale replica of a hypothetical submarine combat control center. The number of personnel increases in each of the first three consecutive phases (transiting, contact prosecution and battle stations) and is logically reflected by increasing values of PDI. However, from the commencement of battle stations through firing point procedures, the number of personnel remains constant. The increase in PDI reflects the increase in congestion of personnel, which was described to be particularly evident in the area starboard of the periscopes, that is, the attack center, where command and fire control functions occur. This example exemplifies the basic square root properties of the PDI formula applied to actual data derived from a naturalistic setting.

Another example for the same PDI application is the comparison of crew density during battle stations between very different sized submarine control rooms, as reflected in FIG. 8. If the crew density for a submarine with a 436 sq. ft. combat control center (Submarine A) is compared with that of a 263 sq. ft. submarine combat control center (Submarine B) using the PDI formula, the PDI value (as reflected in FIG. 8) for Submarine A control room during battle stations is predictably lower than the PDI value of the Submarine B control room, thereby implying that personnel are significantly less congested in the larger Submarine A workspace.

As a further example, PDI can be calculated for a particular area of the submarine control room, such as the area starboard of the periscopes. The area starboard of the periscopes where a majority of attack center personnel are located during battle stations is approximately 86 percent larger on Submarine A than on Submarine B. In this situation, the PDI value is higher for Submarine B than Submarine A, implying that Submarine A is less crowded than Submarine B in the selected area. However, the average man-to-man distance in Submarine A in this workplace is much smaller than the PDI model predicted with $PDI_{min}$ and $PDI_{max}$ calculations given the substantially larger area available for command and fire control functions. Thus, although the total Submarine A workspace is larger in size and observed to be much less crowded than Submarine B, it is almost as crowded in the area starboard of the periscopes.

Additional experiments have been conducted utilizing the PDI model to evaluate combat system configurations by "acting out" a simulated submarine mission in complete detail. They were conducted in a full-scale replica of the submarine combat control center and employed subject matter experts as the crew members. The mission scenarios simulated in the experiment were videotaped for analysis, using time lapse photography techniques. The floor of the replicated attack center was tiled with 2-ft$^2$ tiles, thus making it easy to convert crew and equipment positions to an arbitrary Cartesian coordinate system from which to make interpoint distance measurements. Each crew member could be precisely located at any time during the scenario, and the population density index could be calculated readily. The hypothetical submarine scenario was an antisubmarine warfare scenario in which the crew members within the hypothetical advanced attack center prosecuted and attacked an hypothetical enemy submarine. The mission comprised four consecutive stages: transiting, contact prosecution, battle stations and firing-point procedures. During the mission, increasing numbers of crew members entered the attack center to staff their stations and carry out their assigned tasks. Up to 20 men were counted and filmed during this hypothetical scenario.

The population density index measurements in the step two in Ser. No. 07/756,264 were made at the beginning of each of the four mission stages. For each of the stages it was necessary to select the correct unit lattice to make model projections. Trial and error adjustments were required to identify the unit lattice such that n equidistant points could be accommodated into the dimensions of the attack center. The unit lattice that provided the best fit for transiting, for example, turned out to be the 6×2 lattice (n=12). Hence, all model projections were based on n=12. For contact prosecution, the 7×2 unit lattice was used, and a unit lattice of 7×3 was used for battle stations and firing-point procedures.

TABLE 1

Application of Model of the last-named case in the ¢cross-references" section To Four Stages Of Hypothetical Antisubmarine Warfare Scenario* (Area = 436 ft$^2$)

| Stage | n | $\bar{\Delta}$ | $\delta$ | $PDI_{min}$ | PDI †$_{max}$ | $PDI_{act}$ | $\delta_{eff}$ | $\delta/\delta_{eff}$ |
|---|---|---|---|---|---|---|---|---|
| Transit | 11 | 2.32 | 6.0 | 119 | 715 | 140 | 5.1 | 1.18 |
| Contact Pros. | 13 | 2.65 | 5.6 | 121 | 676 | 160 | 4.2 | 1.33 |
| Battle Stats. | 20 | 2.78 | 4.6 | 173 | 789 | 250 | 3.2 | 1.44 |
| Firing-point Procedures | 20 | 2.78 | 4.6 | 173 | 789 | 350 | 2.3 | 2.10 |

*PDI values scaled by 10$^4$.
† Assumes 1-ft uniform interpoint distance.

Table 1 presents the results from the timelapse photography analysis in terms of the population density index model. The number and activity of personnel increased as the mission progressed. This is indicated by the PDI values in Table 1 (listed as $PDI_{act}$ in Column 7). Initially, 11 men were in the attack center; at the end of the scenario, 20 men were involved. Throughout the simulated mission, some personnel were permanently seated, while others moved continuously throughout the center. During battle stations and beyond, the environment was highly fluid as the hypothetical submarine closed range to assume a position in the ocean to fire a weapon at the hypothetical enemy submarine (without being detected and possibly counterattacked). Fast paced activity and crew stress were clearly evident during the simulation. Note that the actual population density index (Column 7) increased linearly throughout the mission. The last column presents the major finding of the study. The ratio $\delta/\delta_{eff}$ represents the factor by which actual spatial density increases over an hypothetical uniform distribution of minimum spatial density. This ratio also rises steadily as the hypothetical mission progresses. By the firing-point procedures stage, crew congestion increased to over 100% more than the minimum configuration derived for this stage. From first to last stage, the density increased more than twofold. These data can be compared with the conventional density model, as calculated by the equation, $D=n/A$, which indicates less than a doubling of congestion over the lifetime of the hypothetical antisubmarine scenario.

It is interesting to compare the last two stages (battle stations and firing-point procedures) of this hypothetical mission. Each stage employs the same number of persons (20). The conventional density model of the recently stated equation assumes no change in population density from one hypothetical stage to the next. But in the highly fluid firing-point procedures stage, density actually increases by more than 40% over the previous less fluid stage. This implies that in the comparatively large work space of this hypothetical future generation submarine attack center, the mission tasks seem to cause personnel to congest into increasingly smaller clusters of subgroups. The PDI analysis thus resulted in recommendations whereby density (and hence crew stress) could be alleviated thereby increasing the efficiency of the submarine crew.

PDI, as disclosed herein, the first step, below, one possible second step, above, is a significant facilities layout evaluative measurement metric which can be used in multidimensional scaling (MDS). MDS is a well recognized facilities layout mathematical methodology which is disclosed in detail by Siegel, A. I., J. J. Wolf, and J. Pilitis (1982), "A New Method for the Scientific Layout of Work-spaces" *Applied Ergonomics,* 13 (2), 87-90; and by Tullis, T., B. B. Sperling, and A. L. Steinberg (1986), "The Use of Multidimensional Scaling for Facilities Layout: An Application to the Design of the Space Station", *Proceedings of the Human Factors Society*—30th Annual Meeting, 38-42, both publications hereby being incorporated into the instant disclosure in their entirety by reference. Reference can also be had to "Non-Metric Multidimensional Scaling; a Numerical Method" by Kruskal, *Psychometrika,* Vol 29, No 2, June 1964, which shows how a computer can be programmed to do MDS, such as a KYST program, and to the article "Multidimensional Scaling By Optimizing Goodness of Fit to a Nonmetric Hypothesis", by Kruskal, *Psychometrika,* Vol. 29, No. 1, (1964) which shows the derivation of the presently preferred MDS algorithms, both incorporated herein by reference. MDS can be used to arrange, for example, equipment displays in a control room in the step two. Briefly, MDS is a process whereby a matrix of "distances" (either psychological or physical) among a set of objects can be translated into a representation of those objects in space. Typically, the representation is in one-, two-, or three-dimensional space. For purposes of the present invention, only two-dimensional space is being considered. The goal of MDS is to have the distances among the objects in the MDS configuration accurately reflect the distances in the original matrix. For example, MDS is a way of converting a table of mileage between cities into a map showing the relative geographical locations of those cities.

The process starts with some arbitrary or predetermined layout, i.e., a configuration of N points representing the objects to be positioned in a space (for the present case) of two dimensions. Then the points are moved a bit in each successive iteration of the mathematical algorithm in such a way as to decrease the value of a "stress" function which measures the badness-of-fit between the configuration of points and the input data. This process continues typically for 20 to 50 iterations until a stopping criterion is reached, at which time the current coordinates of the objects represent the near-optimum spatial layout. The stopping criterion depends on how fast the stress has been decreasing from iteration to iteration, the size of the gradient, and a minimum stress value which is subject to user modification.

Accordingly, the MDS computer program constructs a configuration of points in the space from information about the "distances" between the points. In the instance of MDS, the "distances" are taken to be measures or metrics such as the frequency of contacts between objects, in such a way that the highest matrix score for any pair of objects represents a strong requirement that they be placed close together, and the lowest score indicates least importance in proximate locations. Other informational measures as indicated in the Tullis et al. article are used in standard MDS applications. The use of PDI in conjunction with an objective capture of behavioral use of an environment via photographic techniques in comparison to the conventional expert retrospective knowledge elicitation technique commonly used is a new unique and useful employment of standard MDS methodology for designing immensely complex work station such as a submarine control room. It is common sense that the more relevant data and input to an objective methodology such as MDS provides more information about which to gain knowledge and thereby impact critical tasks such as the construction of an optimal facility layout. PDI used in MDS provides additional and often ignored critical data for facilities layout, namely, minimizing crew density (hence physical and mental stress) in busy and life threatening military control rooms, among other environments.

The output of two-dimensional multidimensional scaling is computer tabulation of resultant x-y coordinates of each object and a printed plot of the area showing the machine recommended location of each object in the space under consideration.

This plot serves as a preliminary solution layout so that the analyst or layout planner then may, at his or her discretion, make a series of minor manual adjustments to the computer-generated solution. Such adjustments may be desirable to compensate for special needs such a repair access or for physical constraining features of the area such as the location of posts, stairways, and doorways, in the existing area. Accordingly, the multistage method of the step two in the exemplary description provides for the exercise of workspace-user judgments as well as consideration of work imposed conditions. Therefore, the present method is considered to be computer aided, rather than computer generated. This approach, in which the computer offers an initial solution followed by a manual adjustment, is also routinely utilized with success in the very similar problem of micro circuit chip layout on modern electronic printed circuit boards. Here too, an approximately optimum solution is developed automatically followed by vernier adjustments by technicians.

In summary, the MDS methodology reveals the underlying structures in data sets and then presents them in a graphic format, i.e., a geometric configuration/-mapping, suitable for visual analysis and interpretation. Application of PDI to MDS, therefore, assures optimal utilization of space by men and machine in limited space environments in the step two.

It was earlier mentioned that a newer PDI model previously described in F. O'Brien's co-pending application entitled "Process Which Aids in the Laying Out of Location of Personnel and Equipments in Functional Organization, Including Features of Special Applicability Where a Capability for Handling an Unlimited Number of Personnel/Equipment Data Items is Desired" has been developed which will accommodate any number of density points, not merely 100, as disclosed above. To this end, the PDI model is generalized through a derived equation which allows $\bar{\Delta}$ to be calculated for any unit lattice rectangle or square containing any finite number of density points. The equation is given as:

$$\bar{\Delta} = \frac{C \sum_{i=1}^{R-1} (R-i)i + R \sum_{j=1}^{C-1} (C-j)j + 2 \sum_{i=1}^{R-1} \sum_{j=1}^{C-1} (R-i)(C-j)\sqrt{i^2+j^2}}{\frac{(RC)(RC-1)}{2}} \quad (45)$$

where
- R = the number of horizontal points in each row of the unit lattice,
- C = the number of vertical points in each column of the unit lattice, and
- RC = the total number of density points in the unit lattice.

In the foregoing equation, the total number of density points in the unit lattice (RC) may also be referred to as n. Although the quantitative values of RC and n will be equivalent in a density study, the distinction between RC and n is important insofar as n refers to the total number of density points in a density analysis, whereas RC refers to the specific lattice arrangement (i.e., R×C) of the n density points.

To provide a numerical example of this equation, assume that a researcher desires to calculate the average Euclidean distance the 2×2 ft² unit lattice square by use of this equation. Here R=C=2; thus, $$\bar{\Delta} = \frac{2[(2-1)1] + 2[(2-1)1] + 2[(2-1)(2-1)\sqrt{1^2+1^2}\,]}{\frac{(4)(4-1)}{2}} = 1.14 \text{ ft} \quad (46)$$

The model indices, such as the lower and upper bounds of PDI, and effective distance derived previously can now be calculated for any number of density points in a population density study by employing the above equation for the computation of $\bar{\Delta}$, the average Euclidean distance among density points arranged in a unit lattice rectangle or square.

The advantage of this newer population density model is that it measures population density with greater precision and flexibility for any size research project since it can accommodate an unlimited number of density points.

Even more recently, a new technique has been developed in the area of PDI modeling. According to this more recent development, if a researcher cannot calculate the actual PDI ($PDI_{act}$) because it is, in fact, or believed to be, difficult to obtain all of the interpoint distances among the objects in order to calculate $d_{act}$ as previously defined, then an approximate mathematical model in the step two is suggested and herein described below.

Empirical use of the approximation methods has shown the results to be in reasonable agreement with the exact results (when both the exact and approximate results could be obtained and compared) as will be demonstrated subsequently. The derivation of the PDI approximation method showed that the approximate PDI value is bounded by the exact hypothetical minimum ($PDI_{min}$) and hypothetical maximum ($PDI_{max}$) values.

The derivation of the approximation method and the procedures comprising the approximation method are as follows:

1) For a given geometric area (A), with dimensions XY and sample size of objects (n):
   select an approximate unit lattice of dimensions RC (as done in the basic (exact) model); then
   calculate $\bar{\Delta}$ by the general exact formula:

$$\bar{\Delta} = \frac{C \sum_{i=1}^{R-1} (R-i)i + R \sum_{j=1}^{C-1} (C-j)j + 2 \sum_{i=1}^{R-1} \sum_{j=1}^{C-1} (R-i)(C-j)\sqrt{i^2+j^2}}{\frac{(RC)(RC-1)}{2}} \quad (47)$$

to give the unit lattice average Euclidean distance.
   (c) calculate the minimum and maximum bounds of PDI i.e., $PDI_{min}$ and $PDI_{max}$ by the formulas provided previously.

2) Prior to collecting density data in an actual naturalistic setting by means of time lapse photography or other methods, partition the research area XY into n rectangles each with sides equal to $$\frac{X}{R}, \frac{Y}{C} \tag{48}$$

and each with geometric subarea equal to $$\delta^2 = \frac{XY}{RC} = A_j, j = 1, 2, \ldots n \tag{49}$$

such that $$\sum_{j=1}^{n} A_j = A; \text{ i.e., } n\left(\frac{XY}{RC}\right) = A \tag{50}$$

Each rectangle will consist of $n_j$ objects ($n_j \geq 0$) such that $\Sigma n_j = n$. The density of each rectangular subarea is: $D_j = n_j/A_j$ ($D_j \geq 0$). Such work should be done on paper to facilitate tallying.

3) By visual inspection, count the number of rectangles occupied by one or more objects i.e., for which $n_j \geq 1$. That count is called the "cluster count" and denoted m. ($D \leq m \leq n$).

4) Calculate the approximate "effective density" $d_{\mathit{eff}}$, of the total geometric area XY with subarea density defined above as $D_j$ by one of the various equivalent formulas that follows:

$$d_{\mathit{eff}} = \frac{\sum_{j=1}^{m} D_j}{m} = \frac{\sum_{j=1}^{m}\left(\frac{n_j}{a_j}\right)}{m} = \frac{n}{mA_j} = \frac{n^2}{Am} = \frac{n}{m\delta^2} \tag{51}$$

where $\delta^2$ is the relation $$\frac{XY}{RC} \tag{52}$$

$d_{\mathit{eff}}$ is conceptually: $\frac{\text{number of objects}}{\text{total area occupied}}$ where $mA_j$ for example is the total area occupied by n objects ("effective area"). Mathematically, it can be demonstrated that the bounds of $d_{\mathit{eff}}$ are:

$$D \leq d_{\mathit{eff}} \leq 1 \tag{53}$$

5) Calculate the approximate effective interpoint distance given by the formula:

$$\delta_{\mathit{eff}} = \sqrt{\frac{1}{d_{\mathit{eff}}}}; \tag{54}$$

Conceptually, $\delta_{\mathit{eff}}$ means: $\frac{\text{total area occupied}}{\text{number of objects}}$.

The units of $\delta_{\mathit{eff}}$ are feet.

Set $\delta_{\mathit{eff}}$ equal to the conceptual form of $\delta_{\mathit{eff}}$, defined in the inventor's copending application "Process Which Aids in the Laying Out of Locations of Personnel and Equipments in Functional Organizations, Including Features of Special Applicability Where the Number of Personnel/Equipment Data Items Does Not Exceed 100", by substituting the new hypothetical quantity called "estimated actual average interpoint distance", $d'_{act}$:

$$\delta_{\mathit{eff}} = \frac{\overline{d}'_{act}}{\overline{\Delta}} \tag{55}$$

or $$\overline{d}'_{act} = \delta_{\mathit{eff}}\overline{\Delta} \tag{56}$$

which is the desired approximate density quantity to be substituted into the exact PDI formula $PDI_{act}$.

7) In the final step of the PDI approximation method of the step two, calculate the approximate value of $PDI_{act}$, or $PDI'_{act}$, by one of the following formulas:

$$PDI'_{act} = \sqrt{\frac{\frac{n}{A}}{\overline{d}'_{act}}} = \frac{1}{\delta \overline{d}'_{act}} = \frac{1}{\delta(\delta_{\mathit{eff}}\overline{\Delta})} \tag{57}$$

$$= \frac{1}{\overline{\Delta}\sqrt{\frac{A}{n}}\sqrt{\frac{mA_j}{n}}} = \frac{n}{A}\overline{\Delta}\sqrt{\frac{n}{m}} \tag{58}$$

All of the above are mathematically equivalent and equally employable by the layout analyst.

An example of the approximation procedure is provided below: With reference to FIG. 7 ("observation"), the numerical quantities required are supplied as follows:

$$n=12; A=25 \text{ ft}^2; \overline{\Delta}=1.90 \text{ ft}; A_j=25/12=2\ 1/12 \text{ ft}^2 \tag{59}$$

As will be appreciated by a person skilled in the art with which this invention is most nearly connected, visual inspection of FIG. 7 shows that for the 12 subareas with dimensions $$\frac{5}{3} \times \frac{5}{4}, \tag{60}$$

only m=8 of the 12 rectangles have one or more resident objects. Thus, the following set of calculations is performed to estimate $PDI_{act}$:

$$d_{\mathit{eff}} = \frac{n}{mA_j} = \frac{12}{8\left(2\frac{1}{12}\right)} = .72 \tag{61}$$

$$\delta_{\mathit{eff}} = \frac{1}{\sqrt{d_{\mathit{eff}}}} = 1.18 \tag{62}$$

$$\delta_{\mathit{eff}} = \frac{\overline{d}'_{act}}{\overline{\Delta}} \tag{63}$$

$$\overline{d}'_{act} = \delta_{\mathit{eff}}\overline{\Delta} = (1.18)(1.90) \approx 2.24 \tag{64}$$

$$PDI'_{act} = \frac{\sqrt{\frac{n}{A}}}{\overline{d}'_{act}} \approx .31, \tag{65}$$

a value reasonably close to the exact value of 0.30 units.

The above theoretical mathematical information is sufficient to prove that $PDI_{act}$ (approximate) is bounded by the minimum and maximum PDI values, (defined in the inventor's copending patent application "Process Which Aids in the Laying Out of Locations of Personnel and Equipments in Functional Organizations, Including Features of Special Applicability Where the Number of Personnel/Equipment Data Items Does Not Exceed 100") that is:

$$PDI_{min} < PDI'_{act} < PDI_{max} \quad (66)$$

is a true statement.

The PDI approximation method has a useful application in that it can estimate the relationship of objects in a particular space for any number of density points when exact object coordinates cannot be recorded. Although there may appear to be sufficient room between objects using the subjective "eyeball test" the PDI approximation method could indicate otherwise since it is based on sound objective mathematical principles. Using the approximation method, one will be able to calculate the most advantageous placement of objects to minimize crowding. Thus, this method could be used to eliminate clustering of people or objects, enhance peripheral vision and hearing, and provide sufficient elbow room and freedom of movement.

The advantage of this more recent model is that it enables one to obtain an estimate of the PDI model quantities for any number of density points when the actual PDI cannot be calculated while retaining all of the attendant advantages of the previously disclosed discrete spatial density models.

The foregoing gives examples of the algorithms that may be used in the second step of the invention, and the following describes in accord with the present invention algorithms that may be used in the first step. In the first step, a global layout of the objects on a large scale, such as miles, is provided by any suitable expert, such as a proposed base layout provided by a facilities layout manager, using a predetermined symbol system for the objects to be constructed as part of the large-scale layout. The layout of the objects is then quantified using Kruskals' MDS formalism, whereby the proposed layout is arranged in a non-metric MDS initial configuration, a "PDI norm" herein. To this initial configuration, one or more additional MDS matrices representative of quantifiable object relations are specified, such as inter-building transition frequency, sequential activity dependencies, shared support equipment, privacy requirements and other facilities layout criteria as required by a specific application. The initial PDI norm is based on the experts' initial configuration and it quantifies the same to take account of density on the scale of miles. Equation 67 may, with advantage, be used.

$$PDI \text{ norm} = \frac{1}{\delta^2 \overline{\Delta}(RC)} \quad (67)$$

where $\delta$ and $\overline{\Delta}$ (RC) are indicated as follows.

Hereafter, the PDI norm algorithm is presented for (1) determining a unique finite, discrete, conformal RC lattice and (2) computing the average interpoint distance among the RC points.

To begin, it is assumed that n (sample size) and $A = X \times Y$ (the outer rectangular geometric area) are known. If n is a prime number (like 5 or 13 or 29), augment n by 1 before determining the rectangular/square dimensions of the unit lattice. The derivation of the algorithm for selecting an RC lattice is developed from concepts of number theory. In particular, interest is centered on sets and subsets of composite numbers that can be expressed as rectangular or square integers; i.e., positive (nonprime) integers that are two-integer products.

The value of n can be expressed in terms of the prime factors of the whole number:

$$n = \prod_{j=1}^{r} P_j \alpha_j, \quad (68)$$

where $P_j$ represents the jth prime number and $\alpha_j$ is the number of occurrences of the jth prime number of n. For example, composite 60 can be decomposed into $P_1{}^{\alpha 1} P_2{}^{\alpha 2} P_3{}^{\alpha 3} = 2^2 \times 3 \times 5$. Next, it is desired to derive the total number of possible RC (n=RXC) product configurations of n in order to create the set of RC configurations; the latter will be a subset of the former. This number can be derived as follows.

Let $\tau(n)$ represent the number of all possible configurations of a composite integer n. Then it can be shown that this quantity is obtained from equation (68) by $$\tau(n) = \prod_{j=1}^{r} (\alpha_j + 1). \quad (69)$$

For example, sixty (60) can be partitioned into $(2+1)(1+1)^2 = 12$ two-integer products.

Next, the set of the $\tau(n)$ configurations is examined to select only those nontrivial and/or nonredundant configurations. Let $\Phi(RC)$ represent the total number of nonredundant and nontrivial RXC configurations for composite $n, \tau(n) \supset \Phi(RC)$. The trivial configurations are those for which $n = n \times 1$ or $1 \times n$, and the redundant configurations are the multiplicative, commutative equivalents of RXC; i.e., $R \times C = C \times R$ ($R \geq C$)(e.g., $10 \times 4 = 4 \times 10$). Then, $$\Phi(RC) = \frac{\tau(n) - 2 + S}{2}, \quad (70)$$

where $S = 0$ when n is a rectangular number, and $S = 1$ when n is a square number. The set of all such specified configurations is denoted P of size $\Phi(RC) = m$; $P = \{R_1C_1, R_2C_2, \ldots, R_iC_i, \ldots, R_mC_m\}$, $(R_i \geq C_i)$ For example, if $n = 60$, then $\Phi(RC) = [(3 \times 2 \times 2) - 2 + 0]/2 = 5$; $P = \{30 \times 2, 20 \times 3, 15 \times 4, 12 \times 5, 10 \times 6\}$. Note that the trivial ($60 \times 1$, $1 \times 60$) and redundant commutative equivalent configurations ($2 \times 30$, $3 \times 20$, $4 \times 15$, $5 \times 12$, $6 \times 10$) have been eliminated from P. Likewise, for $n = 100$, $\Phi(100) = \Phi(2^2 \times 5^2) = [(3 \times 3) - 2 + 1]/2 = 4$; $P = \{50 \times 2, 25 \times 4, 20 \times 5, 10 \times 10\}$.

Selection of a unique RC lattice with interpoint distance parameter $\delta$ is accomplished by the following guidelines.

Select the RXC lattice configuration (usually one) with dimensions most commensurate with the exterior $X \times Y$ dimensions; i.e., the one for which $X/Y - R/C$ is a minimum absolute difference ($X \geq Y$, $R \geq C$). Determine the uniform interpoint spacing parameter $\delta = \sqrt{A/n} = \sqrt{XY/RC}$. Next, test for conformity of the dimensions of the selected lattice to the study area dimensions by the quantities $(R-1)\delta$ and $(C-1)\delta$. If either of the R,C dimensions is nonconformal (i.e., $(R-1)\delta \geq X$ or $(C-1)\delta \geq Y$), then conform the lattice dimensions by adjusting $\delta$ by the relation $\delta = \min[X/(R-1), Y/(C-1)] - 0.1$. Finally, in the rarest of instances, when commensurability is achieved simultaneously by more than one lattice configuration, the R×C configuration will be that associated with the maximum δ value. If plural maxima δ occur, select the R×C configuration associated with the smallest value of $\overline{\Delta}$.

The symbolic specification of the above guidelines can be stated as follows. Because the desired discrete R×C lattice must be unique, the selection mechanism requires a two-step procedure. First, the following commensurability relation is determined from the dimensions of A and each element of the set P:

$$R_k C_k = \min_{1 \leq i \leq m} \left| \left[ \frac{\max(X,Y)}{\min(X,Y)} - \frac{\max(R_i,C_i)}{\min(R_i,C_i)} \right] \right| (1 \leq k \leq m). \quad (71)$$

Then, based on equation (71) above, δ is determined from one of the following four mutually exclusive and exhaustive conditions:

$$\sqrt{\frac{A}{n}} \text{ if } k = 1 \text{ and } X > (R-1)\delta \text{ and } Y > (C-1)\delta \quad (72)$$

$$\min\left[\left(\frac{X}{R-1}, \frac{Y}{C-1}\right) - 0.1\right] \quad (73)$$

if $k = 1$ and $X \leq (R-1)\delta$ or $Y \leq (C-1)\delta$ $$\max_{1 \leq l \leq k} \left( \min_{2 \leq k \leq m} \left[ \left( \frac{X}{R_k - 1}, \frac{Y}{C_k - 1} \right) - 0.1 \right] \right) \quad (74)$$

if $k > 1$ and $l = 1$ $$\min_{2 \leq l \leq k} [\overline{\Delta}(R_1 C_1)] \text{ if } k > 1 \text{ and } l > 1 \quad (75)$$

In (72) through (75), $\delta \geq 1$ by definition. Also, it may be proven that $\delta \leq \sqrt{A/n}$, where it can be deduced that $(R-1) \delta < X$, $(C-1) \delta < Y$, and for commensurate lattices $(\delta \leq \sqrt{A/n})$, $\delta = X/R = Y/C$.

In summary, if k=1, $R_k C_k$ is the lattice selected from equation (71) and δ is selected from equation (72) or equation (73). If k>1, δ is selected from equation (74) and RXC is selected as the lattice associated with the maximum δ in equation (74). Finally, if (74) provides a plurality of δ values, then (75) is used, which selects the $R_1 C_1 (2 \leq 1 \leq k)$ lattice associated with the smallest $\overline{\Delta}$ value, where the require $\overline{\Delta}$ values may be computed by equation (46). Note that for a unit lattice, or commensurate nonunit lattice, k=1 and equation (72) computes the correct δ.

Thus, equations (71) through (75) provide a unique, conforming lattice with associated interpoint distance parameter δ. A table of prime numbers and factorizations of composite numbers is an indispensable tool for implementing equation (71). There are standard, written, published references which are well known in the art which provide such a table, including Lehmer "Guide to Tables in the Theory of Numbers" *Bulletin 105, National Research Council, Washington, DC* (1941, 1961) containing extensive tables; and Abramowitz and Stegun, "Handbook of Mathematical Functions with Formulas, Graphs and Mathematical Tables", *(Government Printing Office,* 1964) containing abbreviated tables.

These calculations assure that the lengths of the R and C line segments of the nonunit lattice, (R−1) δ and (C−1) δ, containing human density points do not exceed the dimensions of the study area. The utility of adjusting δ (when so required) as recommended resides in plotting minimum/maximum dispersions of the RC density points in the study area.

In general, note that (74) or (75) will be required for determining δ whenever the study area ratio X/Y is equal to the average of the ratios of two equally commensurate lattices.

As disclosed in Kruskal and as understood by those of skill in the art, the several non-metric MDS matrices are weighted and compared, preferably using equal weighting as suggested by Tullis, and a statistical least squares stress formula is used to provide a quantative measure of how well the experts' initial configuration stands up with the quantified factors including PDI norm.

Figure 9:
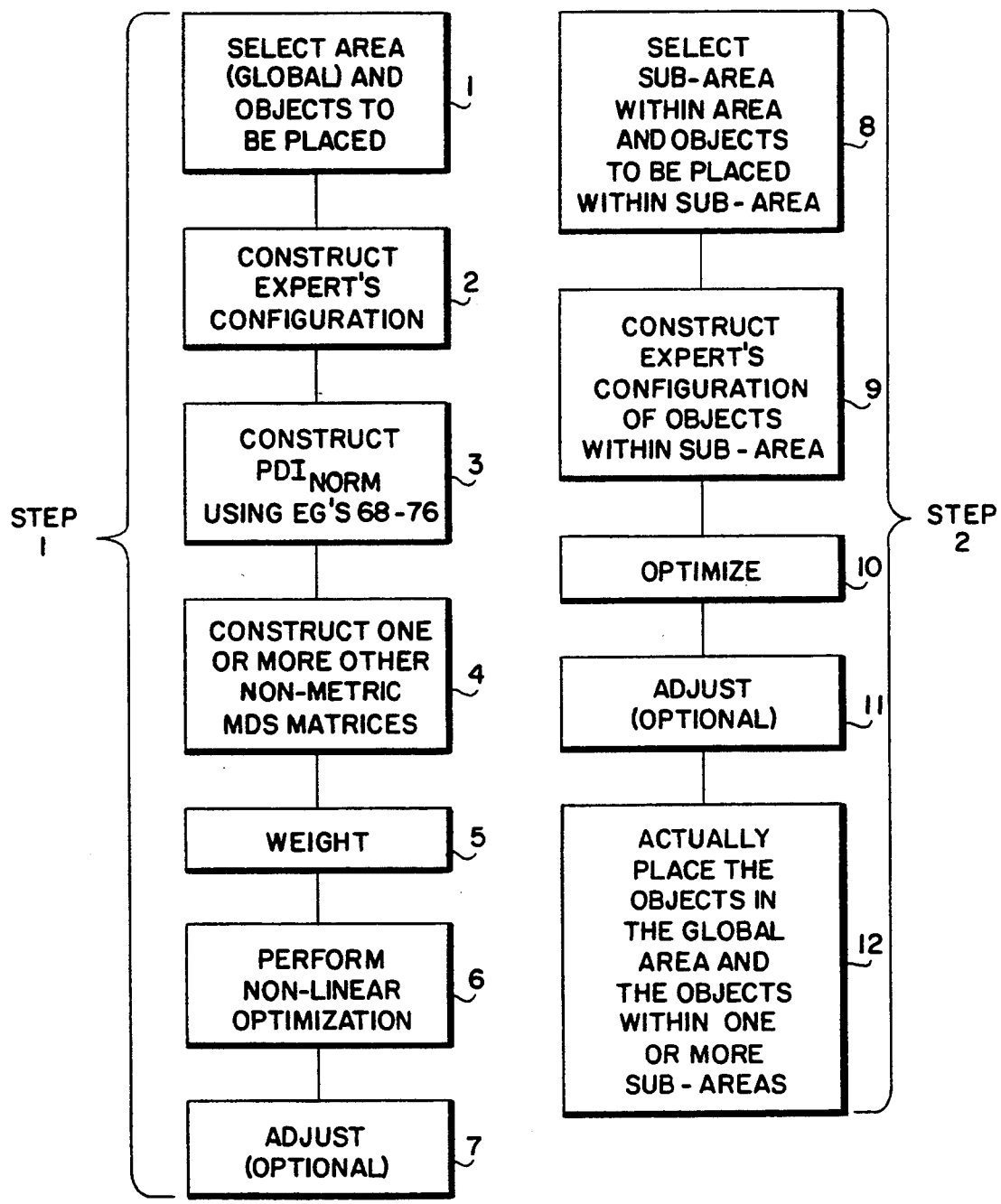
FIG. 9 is a flow chart of the novel two-step methodology laying objects globally and laying objects locally once the objects have been globally layed in accord with the present invention.

This can be seen in FIG. 9. The step 1 that does the global layout, consists of the blocks 1 through 7, and the step 2, that does the local layout, consists of the blocks 7–12. In the block 1, an expert (or group of experts) selects the global area and first objects to be placed therein such as an area where a field base is to be constructed including an air field, field hospital and the rest. In block 2, an initial arrangement of the selected first objects in the global pattern is constructed, using a predetermined scale for representation of the global area in question and using a predetermined scale and symbol system for the one or more first objects placed in the global area by the expert. In block 3, a non-metric MDS matrix is constructed using equations 67–75 that represents the population density of the first objects in the global area. In block 4, one or more non-metric MDS matrices representative of inter-object metrics other than population density on a scale of miles are constructed. In block 5, the non-metric PDI norm MDS metric and the one or more non-metric MDS matrices represented of inter-object metrics other than PDI norm are combined, preferably using a uniform weighting, and in block 6, the weighted and combined matrices are optimized, preferably using a least-squares non-linear "stress" function. In block 7, an optional "manual" adjustment may be made.

In step 2, after the optimization of the first objects in the global area has been uncovered by the novel procedure of step 1 of the present invention, second objects are optimally located at and around one or more of the first objects, such as the equipment and personnel (second objects) to be placed within a field hospital (first object). Any of the techniques disclosed and claimed in Applicant's co-pending applications may, with advantage, be employed in the step 2. In block 8, an expert selects the local area that corresponds to a selected first object, and selects second objects to be placed in the local area, and places them using his or her expert opinion. In block 9, the appropriate one of the PDI procedures of Applicant's copending applications and one or more appropriate non-metric MDS matrices representative of inter-object metrics other than PDI are constructed, using the same predetermined scale and symbol system as employed by the expert in laying out the second objects to be optimally placed by means of step 2 of the invention in the selected first object, itself optimally laid out in the step one of the invention with the other first objects in accord with the present invention. In block 10, the second objects are located optimally by combining the preferably equally weighted non-metric MDS matrices preferably using a non-linear "stress" function, and in block 11, an optional manual adjustment is effected. In block 12, the first objects are then actually placed in the global area according to the step 1 of the invention optimal layout in accord with the step 1 and the second objects are then empirically actually placed in the local area of the one or more first objects in accord with the step 2 of the invention optimal layout. Preferably, this placement is performed in a quick paced fashion, or so to speak by "plumping the objects down". The empirical actual placement step, depending on the specific nature of each particular first and second objects, may involve building, constructing, concrete pouring, erecting, and other techniques known to those of skill in the construction arts.

Many modifications of the presently disclosed invention will become apparent to those of skill in the art without departing from the inventive concepts.

What is claimed is:

1. A method for constructing a facility comprising the steps of:
   (a) selecting a first area where the facility is to be built;
   (b) selecting a first set of objects that are to make up the facility;
   (c) arranging a depiction of said first set of object within a representation of the first area using a predetermined scale for representation of said first area and a predetermined scale and object symbol system for said first set of objects to be placed in said first area;
   (d) constructing a non-metric MDS matrix representing a first population density of said first set of objects in said first area;
   (e) constructing at least one non-metric MDS matrix representative of at least one inter-object matrix other than population density using said depiction of said first set of objects within said representation of said first area;
   (f) combining the matrix of step (d) with the at least one matrix of step (e);
   (g) optimizing the arrangement of the first set of objects in said first area using the combined matrices; and
   (h) building the facility by placing the first set of objects in the first area in accord with the optimized arrangement of the first set of objects in the first area.

2. The method of claim 1, further including the steps of:
   (i) selecting a sub-area of said first area containing at least one of the objects in said first set of objects;
   (j) selecting a second set of objects to be placed in the sub-area;
   (k) arranging a depiction of said second set of objects in a representation of the sub-area using a predetermined scale and object symbol system for said objects in said second set;
   (l) determining a second population density of the second objects arranged in the sub-area and expressing said population density of the second objects in the sub-area as a non-metric MDS matrix using the aforesaid predetermined scale and object symbol system for the objects in the second set of objects;
   (m) determining at least one inter-object metric other than population density of the second set of objects arranged in the sub-area and expressing said at least one inter-object metric as at least one non-metric MDS matrix using the aforesaid predetermined scale and object symbol system for the objects in the second set of objects;
   (n) optimizing the depiction of said second set of objects in the sub-area using the non-metric MDS matrix expressing said second population density and the at least one non-metric MDS matrix expressing said at least one inter-object metric other than population density of the second set of objects; and
   (o) placing the second set of objects in the sub-area in accord with the optimized representation of the second set of objects in the sub-area.

3. The method of claim 1, further including the step of:
   (p) making adjustments to the optimized arrangement.

4. The method of claim 2, further including the step of:
   (g) making adjustments to the optimized representation of the second set of objects in the sub-area.

5. The method of claim 1, wherein the step of constructing at least one non-metric MDS matrix comprises expressing said at least one inter-object metric in the form of an inter-object transition frequency matrix.

6. The method of claim 1, wherein the step of constructing at least one non-metric MDS matrix comprises expressing said at least one inter-object metric other than population density in the form of a sequential activity dependencies matrix.

7. The method of claim 1, wherein the step of constructing at least one non-metric MDS matrix comprises expressing said at least one inter-object metric other than population density as a shared object matrix.

8. The method of claim 1, wherein said optimizing step is performed using a stress function.

9. The method of claim 8, wherein said stess function is a non-linear stress function.

10. The method of claim 2, wherein the step of expressing said at least one inter-object metric comprises expressing said at least one inter-object metric of the second set of objects in the form of an inter-object transition frequency matrix.

11. The method of claim 2, wherein the step of expressing said at least one inter-object metric comprises expressing said at least one inter-object metric other than population density of the second set of objects in the form of a sequential activity dependencies matrix.

12. The method of claim 2, wherein the step of expressing said at least one inter-object metric comprises expressing said at least one inter-object metric other than population density of the second set of objects as a shared object matrix.

13. The method of claim 2, wherein said optimizing step of the second set of objects in the sub-area is performed using a stress function.

14. The method of claim 13, wherein said stress function is a non-linear stress function.

15. The method claim 1, wherein the step of placing the second set of objects in the sub-area is performed empirically.

16. The method of claim 15, wherein the step of placing the second set of objects in the sub-area is further performed in a rapidly paced fashion.

* * * * *